3,057,026
FOUNDRY PROCESS AND MOLDING MIXTURE
Herbert O. Blaies, Jr., Royal Oak, and Charles F. Froberger, Mount Clemens, Mich., assignors to General Motors Corporation, Detroit, Mich., a corporation of Delaware
No Drawing. Filed Apr. 2, 1959, Ser. No. 803,570
6 Claims. (Cl. 22—193)

This invention relates to foundry operations and particularly to an inexpensive shell molding mix which is especially adapted for use in mold blowing machines to produce high quality shell molds. This application is a continuation-in-part of patent application Serial No. 615,515, which was filed on October 12, 1956, now abandoned.

As well known, the shell molding process involves the formation and use of thin-walled dispensable foundry molds and cores composed of sand and resinous binders. This process can be used to produce precision castings in a wide variety of metals.

Essentially the shell molding process consists of using a heat-hardenable plastic or resin as a binder for the grains of sand or other suitable refractory material to form rigid foundry molds having high gas permeability, good surface smoothness and dimensional stability. The molding material, which is generally a mixture of a major proportion of silica sand and a minor proportion of thermosetting resin binder, is normally used in dry or relatively dry form with no water being added. For many applications it is preferable to coat the sand particles with liquid resin before applying the molding mixture to the pattern, while in other instances the resin is merely mixed with the sand in powdered form. Phenol-formaldehyde, phenol-furfural, melamine-formaldehyde and urea-formaldehyde are typical examples of the type of thermosetting binders normally used.

It is desirable to use sand which is free of metal oxides, clay, moisture and organic matter. Silica flour or other finely comminuted refractory facing materials also may be included in the molding mix to provide the molds with exceptionally smooth working surfaces.

These sand-resin molds are prepared by allowing the sand and resin to come into contact with a hot pattern for a short period of time. A generally uniform layer of the mix adheres to the pattern surfaces due to the melting of the resin which bonds the sand with which it is intimately mixed, thereby accurately reproducing pattern details. The half patterns, gates and runners usually are permanently fixed on metal plates. Metal patterns normally must be used because they are subjected to elevated temperatures. Pattern temperatures between 350° F. and 500° F. are typical, but temperatures as low as 250° F. or lower and as high as 700° F. or even higher may be advantageously employed under particular conditions.

The pattern temperature, the characteristics of the resin and sand used, and the length of time the molding material is allowed to remain in contact with the hot pattern determining the thickness of the mold. Mold build-up times generally range from a few seconds to approximately one minute, depending on the particular application. After this short time interval any excess unbounded sand and resin are removed, and the closely adhering sand-resin layer is preferably cured while in contact with the pattern by subjecting it to a temperature within the range of approximately 300° F. to 1500° F. The curing or baking time is relatively short, usually from a few seconds to approximately five minutes. This curing operation results in the conversion of the resinous material to a hard, insoluble binder which securely bonds the sand grains together. After curing of the mold, it is stripped from the pattern and is ready for use. The formed molds, in effect, thin shells which have sufficient strength and stiffness to make them suitable for many casting operations.

The relatively high cost of the organic binder is one of the major reasons why the shell molding process is not used more extensively at the present time. Inasmuch as the sand-resin molding mix normally contains up to about 10% by weight of a thermosetting resin binder, the cost of the binder is a substantial item of expense when this process is employed. This is particularly true in applications which require the inclusion of a finely comminuted refractory material, such as silica flour or powdered spent catalyst material, in the molding mix since such a mixture requires a relatively large amount of binder. The use of a mix containing a fine refractory material is especially desirable in casting steel or other high melting metals by the shell molding process.

Conventionally, a powdered thermosetting resin and a small amount of curing agent are mixed with the desired quantity of a suitable refractory filler material, and the dry mixture is dumped or blown onto the hot pattern without further preparation. Although such a molding mix generally provides satisfactory shell molds in most respects, it is relatively expensive for use in high production applications. Moreover, difficulty is frequently encountered when such molding mixtures are blown rather than dumped. This is particularly true when use is made of shell molding procedures involving first blowing the mix onto a hot metal pattern and subsequently applying pressure to the mold formed on the pattern by means of a heated press head. A process of this type can be advantageously employed to economically produce shell molds in high production quantities since the hot press head, which may serve to cure the shell molds, permits the use of a mix having a relatively low binder content. However, some of the shell molding mixes previously used in this process have not been completely satisfactory because of "segregation" problems with the formed shell. That is, frequently visual separation of the sand and resin was experienced. As a result, the quality of the resultant castings was substantially reduced.

Accordingly, a principal object of the present invention is to provide an improved shell mold and a method of forming the same. A further object of the invention is to provide a shell molding mix containing an inexpensive organic binder which is especially adapted for use in shell mold blowing operations.

These and other objects are attained in accordance with our invention by the use of a shell molding mix having a binder comprising polymerized furfuryl alcohol, phenolic resin and a suitable curing agent or catalyst. A material, such as dialkyl phthalate, which provides the mix with the necessary green strength for blowing, is preferably also included. With such a mix the amount of the relatively expensive phenolic resin may be substantially reduced. Moreover, as will be hereinafter more fully explained, superior shell molds are produced when this mix is used in a process involving blowing molds and curing them under pressure.

Phenol-formaldehyde is the thermosetting phenolic resin preferably employed. Phthalic anhydride may be used as the curing agent or catalyst for the polymerized furfuryl alcohol so that the latter functions as a fast-curing thermosetting resin in the molding mix. Equivalent acid anhydrides, particularly other dibasic acid anhydrides, may be employed in place of the phthalic anhydride, although the latter has proved to be highly successful and is presently preferred. While such a curing agent may be added in either solid or liquid form, it is generally more convenient to use a solid curing agent. Examples of other suitable catalysts are ferric chloride, zinc chloride, sulfuric acid, hydrochloric acid, oxalic acid and maleic anhydride. However, the curing agent must not have a tendency to corrode the heated metal pattern. Phthalic anhydride is preferred not only for this reason, but also because it appears to aid in curing the phenol aldehyde resin in the binder.

A suitable amount of dibutyl phthalate is preferably also included in the molding mix to provide the mix with desirable green strength, particularly when the shell molds are to be blown. Dibutyl phthalate aids in packing the mix properly in the blowhead so that it can be blown without difficulty. If dibutyl phthalate is omitted, the mix has a tendency to set up in the blowhead between blowing operations. It also helps in mixing the binder with the refractory constituents in the molding material. Of course, dibutyl phthalate is not the only additive which may be used to produce the necessary green strength in the molding mix. Among these materials are other dialkyl phthalates, such as dimethyl phthalate, diethyl phthalate and diamyl phthalate, tricresyl phosphate, and a mixture of linseed oil fraction and non-curing phenolic resin.

The polymerized furfuryl alcohol should contain no furfuryl alcohol monomer or only a small amount of such a monomer. Best results are obtained when the polymerized furfuryl alcohol is principally a trimer, although actually a combination of dimer, trimer and tetramer are usually present. Specifically, we have found it desirable to use a liquid polymerized furfuryl alcohol having a molecular weight which averages out between a trimer and a tetramer with the majority of the polymer being trimeric. As indicated above, such a resin may be beneficially cured by an acid catalyst. While optimum results are obtained when there is no appreciable amount of monomer present in the furfuryl alcohol resin, a resin containing up to about 6% by weight of furfuryl alcohol monomer is satisfactory, a 3% to 5% monomeric content being typical of such resins. If the molecular weight of the polymerized furfuryl alcohol indicates that any appreciable quantity of polymer higher than a tetramer is present, the viscosity of the polymer is too high and the resultant mix is difficult to use. A polymerized furfuryl alcohol having a viscosity of approximately 1500 centipoises at 25° C. and a monomeric content of less than 1% by weight is preferred, a viscosity range of 1000 to 2000 centipoises at 25° C. providing excellent results.

Generally, these substantially monomer-free furfuryl alcohol resins should have a viscosity not appreciably above 10,000 centipoises at 25° C. and should be practically free of any unchanged furfuryl alcohol. We have found polymerized furfuryl alcohol of this type to be useful as a shell molding binder constituent when its viscosity is as low as about 500 centipoises at 25° C.

This low viscosity, substantially monomer-free furfuryl alcohol resin may be prepared by condensing furfuryl alcohol with itself in the presence of heat and/or a catalyst, such as phosphoric acid, until a liquid reaction product has been formed. This product will normally contain large amounts of monomeric furfuryl alcohol plus difurfuryl ether, dimeric and trimeric furfuryl alcohol with smaller amounts of tetrameric furfuryl alcohol. The catalyst, if one is employed, is then neutralized and both water and monomeric furfuryl alcohol are distilled off under reduced pressure. The product thus produced is a low-viscosity resinous material which is substantially free of unchanged furfuryl alcohol. The polymerized furfuryl alcohol cures to a resin on the hot pattern in the presence of one of the aforementioned catalysts.

In accordance with the present invention, we have found that satisfactory results are attained with a shell molding mix containing about 0.4% to 5% by weight of the polymerized furfuryl alcohol, 0.05% to 1% by weight of phthalic anhydride or other suitable curing agent, at least 0.4% by weight of dibutyl phthalate, 0.5% to 5% by weight of phenolic resin and the balance substantially all sand. However, it is preferable for the mix to have a polymerized furfuryl alcohol content of 0.6% to 1.5% and a phthalic anhydride content of 0.1% to 0.35%. With regard to the dibutyl phthalate, optimum results have been produced when this constituent is present in amounts between 0.5% and 2% by weight, although larger quantities may be employed. Normally there is no advantage in using more than about 7% dibutyl phthalate or its equivalent. For reasons of economy, it is desirable to use approximately 0.75% to 2% phenol formaldehyde resin, although a 0.5% to 3% range of this material normally provides highly satisfactory results.

This shell molding mix is especially advantageous in high-production shell mold blowing operations because of the fast-curing exothermic binder. Not only does the combination of the polymerized furfuryl alcohol and the phthalic anhydride cure very rapidly, but the curing rate of the phenolic resin is also increased when it is combined with the polymerized furfuryl alcohol. Many of the shell molding mixes heretofore used required too much time for the binders to set and, as a result, the sand particles frequently were not properly bonded together. When this occurs, there is desegregation of the mold shells, particularly on the surfaces which are in a vertical position during the blowing and curing procedure. On the other hand, the shell molding mix described herein solves these problems because the binder undergoes very little shrinkage on curing and sets up very rapidly, thereby permitting the use of short pattern dwell times and curing times. Since this mix also possesses excellent blowability characteristics, the blow cycle likewise may be very short.

In preparing the above-described shell molding mixture, we have found the following procedure to be particularly advantageous. The polymerized furfuryl alcohol is added to appropriate quantities of Juniata sand, lake sand or other suitable comminuted refractory materials, and these constituents are mulled together to provide a uniform mixture. Meanwhile, the phthalic anhydride is dissolved in the dibutyl phthalate, which has been heated to a temperature sufficient to provide excellent solvent action. The resultant mixture of phthalic anhydride and dibutyl phthalate is then added to the sand, and the mulling is continued for several minutes. Next the phenolic resin is added, the mulling action being continued until the binder constituents are thoroughly distributed in the mix.

The shell molding mix thus produced consists of semi-coated sand since the sand grains normally are not completely coated. We have found that such a semi-coated sand possesses optimum green strength. Completely coated sands, on the other hand, usually have excessive green strength and must be dried at elevated temperature to drive off the surplus liquid carrier for the thermosetting resin. The use of the furfuryl alcohol resin in the binder eliminates the need for evaporating off a solvent as is necessary in conventional coating of sands with an alcohol-water solution of phenolic resin. Hence our new shell molding mix normally can be prepared in less than ten minutes, while 20 to 40 minutes are usually required to coat sand with conventional shell mold binders.

It is frequently advantageous to add a hard wax to the molding mixture after the phthalic anhydride and dibutyl phthalate have been introduced. Such a wax functions as an internal lubricant for the shell mold to be formed and aids in the release of the mold from the hot pattern. The wax may be either added to the molding mix in powdered form or it may first be placed in solution, preferably in the hot dibutyl phthalate.

A hard, natural wax having a high melting point, such as carnauba wax, appears to provide optimum results with a minimum of expense. The amount of wax which should be employed may be as small as 0.02% of the total weight of the molding mixture for some applications, but generally it is desirable that at least 0.05% by weight of wax be present in order to completely eliminate adhesion of the mixture to the pattern. Only a small amount of wax is necessary because the wax melts upon contact with the hot pattern and normally tends to flow toward the mold-defining surface of the pattern, thus frequently causing the mold to have its greatest concentration of wax adjacent its molding surface. The wax content of the molding mix may vary with the type of pattern being used, of course, as well as with the type of sand employed and quantity of resin in the mixture. Normally the maximum amount of wax which should be used is approximately 1% by weight since a wax content in excess of 1% weakens the resultant mold shell to too great an extent. This weakening effect is due to the fact that carnauba wax will soften and melt at approximately 190° F., while the resin binders will normally retain their rigidity at about 450° F. or higher. Although the resin binders begin to decompose at this latter temperature, the softening of the wax at substantially lower temperatures, if it is present in excessive amounts, will lower the overall strength of the mold. Moreover, it becomes uneconomical to use amounts of wax greater than 1%, and in most instances amounts appreciably less than this provide optimum results. In view of these considerations, therefore, it is normally preferable to use a sand-resin molding mix containing 0.1% to 0.3% by weight of wax, although generally a wax content between approximately 0.1% and 0.5% is completely satisfactory.

Carnauba wax is not easily vaporized upon contact with a metallic pattern which is maintained at proper temperature, thus permitting the formation of a substantially unbroken film of wax on the hot pattern surface. Highly satisfactory results also can be obtained when less expensive candelilla wax, another hard natural wax, is substituted for a portion of carnauba wax in the aforementioned parting mixtures. Where these two waxes are mixed together, it is preferable to use at least 25% by weight of carnauba wax; and for optimum results the wax should contain at least 50% carnauba wax.

Under some circumstances it also may be desirable to substitute synthetic waxes for part or all of the carnauba wax. It is essential, however, that such synthetic waxes have physical properties which do not appreciably lower the green strength and tensile strength of the shell mold. Polyethylene types of waxes, such as ethylene polymers having a molecular weight between 2000 and 6000 and having free acid groups built into the polymer molecule, have proved to be satisfactory. Normally such waxes have an ASTM ring and ball softening point of about 210° F. to 230° F. and a Brookfield viscosity at 250° F. between approximately 1700 cps. and 2000 cps. Waxes of this type usually are readily soluble in the aforementioned phthalates at temperatures above 180° F. Examples of suitable synthetic waxes are Epolene "N," a polyethylene wax manufactured by Eastman Chemical Products, Inc. and Acrawax, a substituted polyamide of stearic acid produced by Glyco Products Company. Each of these waxes is compatible with the above-described phthalates and forms a clear solution with them at 250° F. It should be noted, however, that generally shell molds containing carnauba wax are more easily removed from the patterns than similar molds containing synthetic waxes.

An example of a shell molding mix embodying the present invention which produced excellent results is one composed of about 3.6% phenol formaldehyde resin, 0.9% polymerized furfuryl alcohol, 0.6% dibutyl phthalate, 0.2% phthalic anhydride, 0.2% carnauba wax and the balance sand, all percentages being by weight. The polymerized furfuryl alcohol had a monomer content of approximately 4%. The phenol formaldehyde resin employed was a "B" stage resin containing 10% to 12% hexamethylenetetramine. Such "B" stage resins frequently contain up to 20% hexamethylenetetramine, and the amount of curing agent originally present in the thermosetting aldehyde resin is not critical, of course. Hence, liquid "A" stage phenol aldehyde resin also can be used provided sufficient hexamethylenetetramine or other suitable curing agent is added to promote curing of the resin.

The foregoing shell molding mix has been successfully used in production to cast automobile camshafts. The aforementioned blow-hot press process was employed in forming the molds, the blow period being the pattern dwell time. Pattern temperatures ranging from 550° F. to 600° F. were used with the former being typical. The camshaft molds were cured at a temperature of about 600° F., and the curing time ranged from 10 to 25 seconds, a 21-second cure being typical.

A small amount of a thermoplastic lignin-type resinous material derived from wood and containing both methoxyl and hydroxyl groups also may be included in the mix. Such a material, which may be referred to as a "lignin-type resin," includes various wood derivative resinous materials obtained from a variety of wood products, including sawdust, wood chips, etc., by physical and/or chemical treatment. Illustrative of this lignin-type resin is a substantially gasoline-insoluble resinous material obtained by extracting a resinous wood with a coal tar hydrocarbon, removing this hydrocarbon by evaporation, leaving a residue comprising a mixture of wood rosin and thermoplastic resinous material, extracting the rosin with a petroleum hydrocarbon, leaving a thermoplastic resinous material frequently referred to as substantially petroleum hydrocarbon-insoluble pin wood resin. Such a material is currently available commercially as "Vinsol" resin, a product of the Hercules Powder Company. Usually a shell molding mix should not contain more than about 4% or 5% of this binder constituent, a "Vinsol" resin content of approximately 1.5% being typical.

Before commencing the first mold-forming cycle, it is beneficial to burn off any residue which has built up on the pattern and to condition the pattern by applying an external mold release agent to its molding surfaces. Emulsions of silicone or carnauba wax may be used for this purpose. This conditioning treatment, which serves to close the pores in the pattern surface, may also be advantageously employed when a new pattern is first placed in use. Once a pattern is conditioned in this manner, the above-described internal lubricant functions as a completely satisfactory mold release agent.

Upon pouring molten metal into a shell mold which is formed in the above-described manner, the hot metal, on coming into contact with the mold, burns the plastic binder to essentially carbon. The gases which are generated readily escape through the highly permeable sand-resin shell. As a result of the plastic breakdown, the shakeout is easily accomplished.

The above-described fast-setting shell molding mix permits a substantial increase in the number of molds produced per unit time. These molds, which show no evidence of segregation even on high rises, faithfully reproduce pattern details, maintain good dimensional tolerance and possess excellent surface qualities. As a result of this superior definition of the shells, there is little "burn-in" on the vertical surfaces of the castings produced. The surfaces of the castings are also substantially free of gas folds. Hence these castings are of very high quality and the scrap rate is exceptionally low.

The term "mold," as used herein, is applied in its generic sense to mean a casting form which includes both molds and cores, this invention not being limited to the former. Similarly, the word "pattern" is used herein as including both mold patterns and core boxes.

While our invention has been described by means of certain specific examples, it is to be understood that the scope of our invention is not to be limited thereby except as defined in the following claims.

We claim:

1. A process for casting with a thin-walled foundry mold, said process comprising forming a sand-organic binder mixture of about 0.4% to 5% by weight of polymerized furfuryl alcohol having a low monomer content, 0.05% to 1% by weight of curing agent for said polymerized furfuryl alcohol, at least 0.4% by weight of green strength additive, 0.5% to 5% by weight of thermosetting phenol aldehyde resin, and the balance substantially all sand, placing said mix into contact with a metal pattern which has been heated to a temperature of at least 250° F. to bond a substantial portion of the sand particles together, thereafter curing the formed shell mold by heating while in contact with said pattern at a temperature of 300° to 1500° F. for a sufficient time to prevent thermal combustion of the organic binder, and casting metal in said cured shell mold while the sand thereof is bound by said organic binder.

2. A method of casting with a foundry mold which comprises placing into contact with a heated pattern a molding mixture consisting essentially of a major proportion of a comminuted refractory filler material and 2% to 10% by weight of an organic binder containing thermosetting aldehyde resin, a polymerized furfuryl alcohol containing less than 6% monomeric furfuryl alcohol and a curing agent for said polymerized furfuryl alcohol, thereafter curing the formed mold shell, removing said shell from said pattern, and casting metal in said cured shell while the sand thereof is bound by said organic binder.

3. A method of casting with a foundry mold having an organic binder, said method comprising mixing together about 0.4% to 5% by weight of low-viscosity polymerized furfuryl alcohol containing not in excess of 6% by weight of monomeric furfuryl alcohol, 0.05% to 1% by weight of phthalic anhydride as a curing agent for said polymerized furfuryl alcohol, at least 0.4% by weight of a dialkyl phthalate having 1 to 5 carbon atoms in each alkyl group, 0.5% to 5% by weight of thermosetting phenol aldehyde resin, 0.05% to 1% by weight of wax mold release agent and the balance substantially all sand, blowing the resultant mixture into contact with the molding surface of a pattern which has been heated to a temperature of at least 250° F., retaining said mixture into contact with said pattern for a period of time sufficient to bond together a substantial portion of the sand particles and to melt said wax adjacent said molding surface, subsequently curing the mold layer thus formed by further heating while in contact with said pattern, thereafter stripping the formed foundry mold from said pattern, and casting metal in said cured mold while the sand thereof is bound by said organic binder.

4. A method of casting with a fast-setting thin-walled foundry mold having an organic binder, said method comprising mixing sand and low-viscosity, polymerized furfuryl alcohol having a low monomer content, heating a quantity of dibutyl phthalate, dissolving phthalic anhydride in said heated dibutyl phthalate, adding the resultant hot solution to said sand-polymerized furfuryl alcohol mixture and mulling said solution into said mixture, thereafter introducing phenol aldehyde resin to the mixture thus formed, mulling said phenolic resin with said mixture to thoroughly distribute said phenolic resin therein, said polymerized furfuryl alcohol, dibutyl phthalate, phthalic anhydride and phenolic resin being added to said sand in amounts sufficient to provide a shell molding mix consisting essentially of about 0.4% to 5% by weight of polymerized furfuryl alcohol, 0.05% to 1% by weight of phthalic anhydride, at least 0.4% by weight of dibutyl phthalate, 0.5% to 5% by weight of phenolic resin and the balance substantially all sand, placing said molding mix into contact with a pattern which has been heated to a temperature of at least 250° F. for a period of time sufficient to bond a substantial portion of the sand particles together, thereafter curing the formed shell mold by further heating while in contact with said pattern at a temperature of 300° F. to 1500° F. for a sufficient time to prevent thermal combustion of the organic binder, and casting metal into said cured shell mold while the sand thereof is bound by said organic binder.

5. A molding mix for forming foundry molds comprising a major proportion of comminuted refractory filler, about 0.4% to 5%, by weight, of low-viscosity, substantially monomer-free polymerized furfuryl alcohol, 0.05% to 1%, by weight, of a curing agent for said polymerized furfuryl alcohol, a least 0.4%, by weight, of a dialkyl phthalate having 1 to 5 carbon atoms in each alkyl group and 0.5% to 5% of an aldehyde resin from the group consisting of phenol-formaldehyde resin, melamine formaldehyde and urea formaldehyde resin.

6. A molding mix for forming foundry molds comprising a major proportion of comminuted refractory material, about 0.05% to 1%, by weight, of a mold release agent and about 2% to 10%, by weight, of an organic binder, said organic binder including, by weight of the total mix, about 0.5% to 5% of a thermosetting aldehyde resin from the group consisting of phenol-formaldehyde resin, melamine formaldehyde resin and urea formaldehyde resin, 0.4% to 5% of low-viscosity, substantially monomer-free polymerized furfuryl alcohol, 0.05% to 1% of a curing agent for said polymerized furfuryl alcohol and 0.4% to 7% of a dialkyl phthalate from the group consisting of dimethyl phthalate, diethyl phthalate, diamyl phthalate and dibutyl phthalate.

References Cited in the file of this patent

UNITED STATES PATENTS

| | | |
|---|---|---|
| 1,856,371 | Baldwin | May 3, 1932 |
| 2,383,790 | Harvey | Aug. 28, 1945 |
| 2,401,760 | Heyroth | June 11, 1946 |
| 2,433,168 | Staeger | Dec. 23, 1947 |
| 2,470,440 | Kusmick | May 17, 1949 |
| 2,471,600 | Adams | May 31, 1949 |
| 2,471,631 | Lebach | May 31, 1949 |
| 2,683,296 | Drumm et al. | July 13, 1954 |
| 2,923,989 | Thompson | Feb. 9, 1960 |

FOREIGN PATENTS

| | | |
|---|---|---|
| 631,109 | Great Britain | Oct. 27, 1949 |
| 215,309 | Australia | June 9, 1958 |